United States Patent Office 2,878,188
Patented Mar. 17, 1959

2,878,188
SAFETY GLASS CLEANING

William A. Callahan, Detroit, Mich., assignor to Detrex Chemical Industries, Inc., a corporation of Michigan No Drawing. Application February 8, 1955
Serial No. 486,980

3 Claims. (Cl. 252—136)

This invention relates to a composition and method for cleaning glass.

The modern mass production methods for manufacturing safety glass almost always inevitably include a cleaning operation. Safety glass is essentially a laminated article including a resinous or plastic sheet between two pieces of glass. However, the technology of production is somewhat more complicated. In the production of safety glass the plastic sheet is placed between the glass pieces and the product heated under mechanical pressure. This forces out entrapped air and establishes a bond between the glass and plastic. It is then desirable to give the safety glass further heat treatment. This is done by putting the glass under hydraulic pressure in an autoclave. The autoclaves used for this operation are essentially large tanks of several thousand gallons capacity which can be put under pressure. The tanks contain sufficient oil so that when safety glass articles are put into the autoclave the articles are completely submerged. Pressure is applied to the autoclave filled with oil and safety glass articles and the temperature is raised to a value necessary to give a clear transparent article. After a predetermined time the pressure is released and the laminated glass articles are removed from the autoclave.

At this point the oil should be removed from the glass before the next manufacturing operation is performed. Although it might be suggested to degrease the glass using the solvent degreasing process, it has been found that since the plastic is affected by chlorinated hydrocarbon solvents this method is not commercially practicable. It is the present practice to use a mixture of pumice and water, and to scrub the glass with rotating brushes to remove the oil. This operation has been practiced in a conveyorized washer, and has been somewhat successful as long as the safety glass articles were flat. Since the advent of curved glass windshields and rear windows for automobiles, the manufacturers of these articles have been pressed for better cleaning methods. The pumice-water mixture and method are subject to the objection that the mechanical devices which are necessary to the operation become complicated and thereby costly.

It would seem that one possible solution to the problem would be to treat the glass with an alkaline cleaner of the type that is in common use in the metal finishing industry. However, it has been found that such methods have certain drawbacks. If a piece of glass is wetted with an alkali cleaning solution and allowed to dry in air the resulting residue does not rinse off entirely and the glass is badly etched. It is not necessary that the glass stand in contact with the residue of evaporation for long periods of time. It has been found that even as short a time of contact as two hours so badly etches the glass that it is unfit for use as a windshield or an automobile side window.

In a production line that is engineered for continuous operation, there are times when the operation is at a standstill due to power failures, mechanical difficulties, change of shifts, etc. Glass which is in process at this time has an opportunity to become dry. If the glass is in contact with an alkaline residue it may well be spoiled and have to be scrapped.

When various types of acidic cleaning agents are used, they attack the mild steel parts of the cleaning equipment, and require the use of special acid-resistant parts, etc.

In accordance with this invention the safety glass panel (which has oil or the like on its surface) is cleaned by projecting against its surface, at high velocity, a stream of an aqueous acidic solution of an alkali metal-dihydrogen phosphate having a pH of about 3–7. The preferred pH is about 4–4½. This procedure completely removes grease, oil or other organic residues from the glass surface without attacking the plastic component of the glass, and without attacking the glass surface even if residual solution is permitted to dry on the glass. Moreover, any such dry residue may readily be removed from the glass by rinsing or wiping.

The dihydrogen phosphates of the solution include the dihydrogen orthophosphates and pyrophosphates of the alkali metals such as sodium and potassium, for example, and equivalents. For purposes of this process, ammonium is the equivalent of the alkali metals. Typical dihydrogen phosphates include $NaH_2PO_4$, $KH_2PO_4$, $Na_2H_2P_2O_7$, and $K_2H_2P_2O_7$, for example.

Preferably, a small quantity of a detergent is incorporated into the dihydrogen phosphate cleaning solution. Various detergents are suitable, provided they are compatible with the dihydrogen phosphate and do not unduly increase the pH of the aqueous cleaning solution. Typical detergents include the alkali metal salts of fatty acids, etc. Wetting agents are also desirably incorporated into the solution. Such wetting agents may include the alkyl phenolethylene oxide condensation products which are non-ionic surface active agents, salts of substituted aromatic sulfonic acids, or salts of ethylene diamine tetraacetic acid, for example. Various mixtures of suitable compatible detergents and surface active agents may be employed.

The presence of a suitable and compatible wetting agent in the solution is very beneficial since, under the turbulence of the spray or jet, a momentary emulsion is formed which removes oil or grease from the glass surface. The momentary emulsion usually breaks quickly when it returns to the relatively quiescent reservoir of the power washer. It has also been found that certain oils which have been used repeatedly form a very stable emulsion even when the emulsion is quiescent, and a wetting agent aids in breaking the emulsion. It is preferred to combine anionic and non-ionic types of wetting agents which combination reduces the amount of foam as compared to the foam produced by either type of wetting agent used alone.

When the chemical components of the composition are to be packaged and shipped dry, it is desirable to provide about 1–5% by weight of a light oil of the kerosene type, to control the dust of the mixture.

Although the relative proportions of the dihydrogen phosphate and the detergent or wetting agent are not critical, it is preferred to utilize a very small relative proportion of detergent. For example, a suitable range is 90–99% by weight alkali metal dihydrogen phosphate and 1–10% by weight detergent or wetting agent.

The following examples are illustrative of the invention, percentages being by weight.

*Example 1*

| | Percent |
|---|---|
| Monosodium phosphate, anh. | 89 |
| Sodium sulfate, anh. | 4 |
| Phosphoric acid, 75% tech. | 7 |
| | 100 |

The above solution, dissolved in water at a concentration of about 1 ounce per gallon, and sprayed upon an oily curved safety glass windshield, completely cleaned the surface of the windshield without damaging the glass.

Example 2

| | Percent |
|---|---|
| Monosodium phosphate, anh. | 89 |
| Sodium sulfate, anh. | 8 |
| Phosphoric acid, 75% tech. | 3 |
| | 100 |

Example 3

| | |
|---|---|
| Monosodium phosphate, anh. | 70 |
| Sodium sulfate, anh. | 28 |
| Phosphoric acid, 75% tech. | 2 |
| | 100 |

Example 4

| | |
|---|---|
| Monosodium phosphate, anh. | 96 |
| Phosphoric acid, 75% tech. | 2 |
| Triton X-100 wetting agent (a condensation product of an alkyl phenol and ethylene oxide) | 2 |
| | 100 |

Example 5

| | |
|---|---|
| Monosodium phosphate, anh. | 95.66 |
| Igepal CA-630 (an alkyl benzoxy polyoxyethylene ethanol) | 1.52 |
| Kerosene | 2.82 |
| | 100.00 |

Example 6

| | |
|---|---|
| Monosodium phosphate, anh. | 88.7400 |
| Igepal CA-630 (an alkyl benzoxy polyoxyethylene ethanol) | 1.5100 |
| Kerosene | 3.0200 |
| Butanol | .6732 |
| Licorice extract, powder | 1.0100 |
| Spirit yellow OO (dye) | .0068 |
| Boric acid, tech. | 5.0400 |
| | 100.0000 |

Example 7

| | |
|---|---|
| Monosodium phosphate | 86.0 |
| Disodium phosphate | 3.5 |
| Benzoic acid | 2.5 |
| Santomerse #1 (sodium dodecyl benzene sulfonate) | 6.0 |
| Versene, regular (sodium salt of ethylene diamine tetra-acetic acid) | 1.0 |
| Triton X-100 (a condensation product of an alkyl phenol and ethylene oxide) | 1.0 |
| | 100.0 |

Example 8

| | |
|---|---|
| Monosodium phosphate | 65.0 |
| Disodium phosphate | 2.5 |
| Benzoic acid | 2.5 |
| Sodium sulfate | 25.0 |
| Triton X-100 (a condensation product of an alkyl phenol and ethylene oxide) | 3.5 |
| Triton 9X-123 (an alkyl benzoxy polyoxyethylene ethanol) | 1.5 |
| | 100.0 |

Example 9

| | |
|---|---|
| Monosodium phosphate | 76.8 |
| Disodium phosphate | 20.0 |
| Kerosene | 2.0 |
| Igepal CA-630 (alkyl phenoxy polyoxyethylene ethanol) | 1.2 |
| | 100.0 |

Example 10

| | Percent |
|---|---|
| Sodium sulfate | 45.0 |
| Boric acid | 4.0 |
| Sodium nitrate | 10.0 |
| Disodium phosphate | 16.0 |
| Monosodium phosphate | 20.0 |
| Triton X-100 (a condensation product of an alkyl phenol and ethylene oxide) | 3.5 |
| Triton 9X-123 (an alkyl benzoxy polyoxyethylene ethanol) | 1.5 |
| | 100.0 |

Example 11

| | |
|---|---|
| Potassium dihydrogen pyrophosphate | 95.0 |
| Kerosene | 1.0 |
| Santomerse #1 (sodium dodecyl benzene sulfonate) | 4.0 |
| | 100.0 |

Example 12

| | |
|---|---|
| Potassium dihydrogen pyrophosphate | 95.66 |
| Igepal CA-630 (alkyl phenoxy polyoxyethylene ethanol) | 1.52 |
| Kerosene | 2.82 |
| | 100.00 |

The solutions of Examples 1–12, at concentrations of about ⅛–5 ounces per gallon, produced good cleaning results without attacking the glass.

In the table below are shown the pH of solutions of the first ten of the above examples at a concentration of one ounce per gallon. Detroit city tap water was used throughout and a solution temperature of 28° C. maintained during measurement.

| Example: | pH at 1 oz./gal. |
|---|---|
| 1 | 3.5 |
| 2 | 4.3 |
| 3 | 4.85 |
| 4 | 4.7 |
| 5 | 5.2 |
| 6 | 5.2 |
| 7 | 5.44 |
| 8 | 5.48 |
| 9 | 6.2 |
| 10 | 6.62 |

Example 13

A safety glass panel was washed with a dilute aqueous solution of an alkaline mixture having the following analysis:

| | Percent by weight |
|---|---|
| $Na_2O$ | 50.25 |
| $CO_2$ | 14.7 |
| $P_2O_5$ | 2.79 |
| $SiO_2$ | 11.25 |
| $H_2O$ | 19.6 |

A solution of this compound has a pH of about 12 at a concentration of an ounce per gallon. This is quite strongly alkaline. The solution removed oil from the safety glass, but badly etched the glass.

Although various specific solutions have been described herein, it should be emphasized that the essential ingredients are dihydrogen phosphate and detergent. The other components are of advantage in specific cases, but are not required in the practice of the method.

Having thus described my invention, I claim:

1. In a method of removing organic material from the surface of uninstalled safety glass, said safety glass containing a plastic material which is subject to attack if contacted by organic oil and grease solvents, said plastic material being partially exposed along an edge of said safety glass and said safety glass having a shape other than a flat plane, the step which comprises spraying against the surface of said glass an aqueous acidic solution of an alkali metal dihydrogen phosphate having a pH of about 3-7.

2. In a method of removing organic material from the surface of uninstalled safety glass said safety glass containing a plastic material which is subject to attack if contacted by organic oil and grease solvents, said plastic material being partially exposed along an edge of said safety glass and said safety glass having a shape other than a flat plane, the step which comprises spraying against the surface of said glass an aqueous acidic solution of monosodium phosphate having a pH of about 3-7.

3. The method defined in claim 2, wherein said solution contains a small proportion of a surface active agent selected from the group consisting of alkyl phenoxy polyoxyethylene ethanol, sodium dodecyl benzene sulfonate, alkyl benzoxy polyoxyethylene ethanol, the sodium salt of ethylene diamine tetraacetic acid and polyethylene glycol alkyl aryl ether.

References Cited in the file of this patent
UNITED STATES PATENTS

| | | |
|---|---|---|
| 2,109,575 | Parsons et al. | Mar. 1, 1938 |
| 2,316,220 | Brown et al. | Apr. 13, 1943 |
| 2,524,380 | Flaxman | Oct. 3, 1950 |
| 2,609,308 | Gibson | Sept. 2, 1952 |

OTHER REFERENCES

Chemical Formulary, Bennett, Chem. Pub. Co., New York, vol. 6 (1943), page 482.

Condensed Chemical Dictionary, Reinhold Pub. Co., 4th ed., 1950, pp. 611-612.

Chemical Formulary, Bennett, vol. IX, p. 515, Chemical Pub. Co., Inc., N. Y. (1951).